US009939294B2

(12) United States Patent
Liu et al.

(10) Patent No.: US 9,939,294 B2
(45) Date of Patent: Apr. 10, 2018

(54) DEMODULATION SYSTEM FOR 3D-MATRIX MULTI-CHANNEL FIBER OPTIC SENSING

(71) Applicant: ANDOL TECHNOLOGY, INC., Nanjing (CN)

(72) Inventors: Deguang Liu, Jiangsu (CN); Yifei Qian, Jiangsu (CN); Yihua Zhang, Jiangsu (CN)

(73) Assignee: ANDOL TECHNOLOGY, INC., Nanjing, Jiangsu (CN)

( * ) Notice: Subject to any disclaimer, the term of this patent is extended or adjusted under 35 U.S.C. 154(b) by 292 days.

(21) Appl. No.: 14/774,370

(22) PCT Filed: Aug. 29, 2014

(86) PCT No.: PCT/CN2014/085472
§ 371 (c)(1),
(2) Date: Sep. 10, 2015

(87) PCT Pub. No.: WO2015/103887
PCT Pub. Date: Jul. 16, 2015

(65) Prior Publication Data
US 2016/0025523 A1    Jan. 28, 2016

(30) Foreign Application Priority Data

Jan. 10, 2014    (CN) .......................... 2014 1 0011457

(51) Int. Cl.
*G01D 5/353*    (2006.01)
(52) U.S. Cl.
CPC ......... *G01D 5/353* (2013.01); *G01D 5/35316* (2013.01); *G01D 5/35383* (2013.01)

(58) Field of Classification Search
CPC ..... G01B 11/165; G01B 11/16; G01B 11/161; G01D 5/353; G01D 5/35303;
(Continued)

(56) References Cited

U.S. PATENT DOCUMENTS 5,781,297 A    7/1998   Castore
6,597,822 B1 *   7/2003   Moslehi ................ G01B 11/16
                                                        250/227.14
(Continued)

FOREIGN PATENT DOCUMENTS

CN    102322888    1/2012
CN    102798411    11/2012
(Continued)

OTHER PUBLICATIONS

International Search Report filed in PCT/CN2014/085472 dated Nov. 28, 2014.

*Primary Examiner* — John Lee
(74) *Attorney, Agent, or Firm* — Rankin, Hill & Clark LLP

(57) ABSTRACT

A demodulation system for 3D-matrix multi-channel fiber optic sensing includes a wavelength swept optical source that generates an incident light, an optical frequency domain reflector and a balanced detector connected with the wavelength swept optical source through a fiber circulator. The optical frequency domain reflector includes a first optical path and a second optical path with a frequency shifter arranged on one or both of the optical paths. The optical frequency domain reflector outputs incident light to an optical switch module. The optical switch module selectively transmits the incident light to a sensor network as well as transmits the reflection light from the sensor network to the optical frequency domain reflector.

16 Claims, 3 Drawing Sheets

(58) Field of Classification Search
CPC ............ G01D 5/35306; G01D 5/35309; G01D 5/35316; G01D 5/35319; G01D 5/35322; G01D 5/35325; G01D 5/35329; G01D 5/35332; G01D 5/35354; G01D 5/35358; G01D 5/35361; G01D 5/35367; G01D 5/35383; G01D 5/35387; G01D 5/3539; G01D 5/35393; G01D 5/35396
See application file for complete search history.

(56) References Cited

U.S. PATENT DOCUMENTS

| | | | | |
|---|---|---|---|---|
| 8,565,861 | B2* | 10/2013 | Taira | A61B 1/043 600/476 |
| 8,909,040 | B1* | 12/2014 | Parker, Jr. | G02B 6/35 398/25 |
| 8,923,349 | B2* | 12/2014 | Huber | H01S 3/06791 372/18 |
| 9,441,948 | B2* | 9/2016 | Vakoc | G01N 21/21 |
| 9,719,883 | B2* | 8/2017 | Chen | G01M 11/3181 |
| 2002/0063866 | A1* | 5/2002 | Kersey | E21B 47/102 356/478 |
| 2005/0271395 | A1* | 12/2005 | Waagaard | G01D 5/35383 398/189 |
| 2006/0076476 | A1* | 4/2006 | Thingbo | G01D 5/3539 250/227.23 |
| 2007/0002327 | A1* | 1/2007 | Zhou | A61B 3/102 356/456 |
| 2007/0024857 | A1* | 2/2007 | Menezo | G01D 5/266 356/478 |
| 2007/0053626 | A1* | 3/2007 | Takei | G01B 11/18 385/13 |
| 2007/0171402 | A1* | 7/2007 | Watley | E21B 47/102 356/73.1 |
| 2007/0252998 | A1* | 11/2007 | Berthold | G01D 5/268 356/450 |
| 2007/0258319 | A1* | 11/2007 | Ronnekleiv | G01D 5/35383 367/20 |
| 2007/0280693 | A1* | 12/2007 | Meyer | G01D 5/35383 398/79 |
| 2007/0291274 | A1* | 12/2007 | Drabarek | G01B 11/2441 356/478 |
| 2008/0037608 | A1* | 2/2008 | Zhou | G01N 21/4795 372/50.11 |
| 2008/0068586 | A1* | 3/2008 | Kishida | G01B 11/18 356/32 |
| 2008/0170858 | A1* | 7/2008 | Barry | H04B 10/508 398/87 |
| 2009/0122319 | A1* | 5/2009 | Ronnekleiv | G01H 9/004 356/477 |
| 2010/0014071 | A1* | 1/2010 | Hartog | G01M 11/3127 356/73.1 |
| 2010/0097615 | A1* | 4/2010 | Fan | G01M 11/3172 356/477 |
| 2010/0103426 | A1* | 4/2010 | Kim | G01J 3/02 356/446 |
| 2010/0134783 | A1* | 6/2010 | Omichi | G01B 11/18 356/33 |
| 2010/0183258 | A1* | 7/2010 | Chow | G01D 5/35383 385/12 |
| 2011/0058178 | A1* | 3/2011 | Tearney | A61B 5/0062 356/479 |
| 2012/0236883 | A1* | 9/2012 | Adler | H01S 3/08013 372/20 |
| 2013/0077088 | A1* | 3/2013 | Shao | H04B 10/071 356/73.1 |
| 2013/0100456 | A1* | 4/2013 | Yu | H01S 3/0823 356/479 |
| 2013/0140445 | A1 | 6/2013 | Yoshida et al. | |
| 2013/0301978 | A1* | 11/2013 | Meyer | G01D 5/35358 385/12 |
| 2014/0341501 | A1* | 11/2014 | Taverner | G01D 5/35316 385/12 |
| 2016/0025523 | A1* | 1/2016 | Liu | G01D 5/353 250/227.21 |
| 2016/0256051 | A9* | 9/2016 | Kulkarni | A61B 3/102 |

FOREIGN PATENT DOCUMENTS

| | | |
|---|---|---|
| CN | 103438915 | 12/2013 |
| CN | 103776474 | 5/2014 |
| CN | 203772289 | 8/2014 |

* cited by examiner (a)   (b)

DEMODULATION SYSTEM FOR 3D-MATRIX MULTI-CHANNEL FIBER OPTIC SENSING

TECHNICAL FIELD

The present invention relates to a demodulation system for 3D-matrix multi-channel fiber optic sensing, and belongs to the field of fiber optic sensors.

BACKGROUND

Fiber optic sensors have become increasingly popular in multi-channel or long distance sensing systems because of their relative immunity from electromagnetic interference, intrinsic safety, and high reliability. A fiber Bragg grating (FBG) is a type of distributed Bragg reflector constructed in an optical fiber that reflects particular wavelengths of light and transmits all others. This is achieved by creating a periodic variation in the refractive index of the optical fiber. Changes in the temperature or applied strain will alter either the Bragg period or the refractive index of the Bragg grating; this in turn causes the wavelength at which the fiber Bragg gratings reflect to change.

FBGs (fiber Bragg gratings) have intrinsic advantages, such as accurate measurement of wavelength shifts. A large number of fiber Bragg grating sensors can be grouped into a 3D-matrix multi-channel sensing system. In such a sensing system, the number of involved sensors can vary depending on the measurement range and the number of channels of the optical switches used.

Traditional techniques to interrogate this sophisticated sensing system include wavelength-, time-, and frequency-division multiplexing (WDM, TDM, FDM), or a combination thereof. By using multiple wavelengths of optical signals carried over a single fiber, each carrying a separate channel corresponding to an optical sensor, WDM technique enables significant increase in the processing ability and decrease in the interrogation cost. TDM technique allows the interrogation of multiple optical sensors using a modulated pulse, and by tuning the group delay, the interrogation ability is enhanced. Similar to the TDM technique, the FDM technique employs frequency modulation and demodulation to enhance the interrogation ability.

Though these are well-established interrogation techniques, their limitations are also well recognized. The WDM technique requires that sensors spectra must not overlap; TDM and FDM techniques both involve a high-speed pulse modulator and frequency modulator, as well as a complicated high-bandwidth measurement system.

SUMMARY

Object of the Invention

The present invention provides a demodulation system for 3D-matrix multi-channel fiber optic sensing that allows more rapid and efficient measurement in a quasi-distributed sensor network.

Technical Solution

The technical solution employed by the present invention is a demodulation system for 3D-matrix multi-channel fiber optic sensing which comprises a wavelength swept optical source that generates an incident light. The demodulation system further comprises an optical frequency domain reflector and a balanced detector connected with the wavelength swept optical source through a fiber circulator. The optical frequency domain reflector comprises a first optical path and a second optical path with a frequency shifter arranged on one or both of the optical paths. The optical frequency domain reflector outputs the incident light to an optical switch module. The optical switch module selectively transmits the incident light to the sensor network as well as transmits the reflection light from the sensor network to the optical frequency domain reflector. The interfering signal generated from the reflection light after passing through the optical frequency domain reflector is detected by the balanced detector.

In an improvement of the present invention, the optical frequency domain reflector comprises a first 3 dB coupler and a second 3 dB coupler. The first optical path and the second optical path have their inlets connected to the first 3 dB coupler and their outlets connected to the second 3 dB coupler.

In an improvement of the present invention, at least one frequency shifter is connected in series on one optical path, and a polarization controller is arranged on the other optical path.

In an improvement of the present invention, a polarization controller and at least one frequency shifter are connected in series on one optical path, and at least one frequency shifter is connected in series on the other optical path.

In an improvement of the present invention, the frequency shifters on the two optical paths change the frequency in opposite directions.

In another improvement of the present invention, the optical switch module consists of two optical switches connected in parallel, with the input of one of the optical switches cascaded with an optical fiber. Alternatively, the optical switch module includes a single optical switch.

In another improvement of the present invention, the sensor network consists of a plurality of parallel sensor cables. A plurality of FBG sensors, e.g. three identical FBG sensors, is connected in series on each of the sensor cables. Alternatively, a plurality of sensor sets may be connected in series on each of the sensor cables, and each of the sensor sets consists of a plurality of FBG sensors connected in series. The spacing between neighboring sensor sets is greater than the spatial resolution.

In another improvement of the present invention, the wavelength swept optical source is a wavelength tunable laser source or a Fourier-domain mode locking laser.

In still another improvement of the present invention, the signal processed by the balanced detector is expressed as:

$$I^k(\lambda) = \sum_{i=1}^{O*M}\left[\prod_{j=1}^{i-1}[1-R_j(\lambda)]^2 R_i(\lambda)\sin\left(\frac{4\pi n_{e\!f\!f}L_i\Delta f}{ct_{sw}}t\right)\right] +$$
$$\sum_{i=1}^{O*M}\left\{\prod_{j=1}^{i-1}[1-R_j(\lambda)]^2 R_i(\lambda)\sin\left[\frac{4\pi n_{e\!f\!f}(L_0+L_i)\Delta f}{ct_{sw}}t\right]\right\},$$

where c is the velocity of light in vacuum, $n_{e\!f\!f}$ is the effective group refractive index of the optical fiber, $L_i$ is the length between the second 3 dB coupler and the i-th sensor, $L_0$ is the length of the optical fiber, $\Delta f$ and $t_{sw}$ are the frequency sweep range and the frequency sweep period of the frequency shifter, respectively, and $R_i(\lambda)$ is the reflectivity of the i-th sensor at light wavelength $\lambda$.

In still another improvement of the present invention, the sensor network comprises a plurality of FBG sensors having a spatial resolution expressed as:

$$\delta L = \frac{c}{2n_{\text{eff}}(\Delta f_1 + \Delta f_2 + \ldots + \Delta f_Q)},$$

where Q is the number of the frequency shifters, c is the velocity of light in vacuum, $n_{\text{eff}}$ is the effective group refractive index of the optical fiber, and $\Delta f_i$ (i=1, 2, ... Q) is the frequency sweep range of the i-th frequency shifter.

Beneficial Effects

The present invention has made changes to the complicated structure of existing OFDR demodulation systems to identify the locations of FBG sensors through a Fast Fourier Transform using existing optical devices, thereby enabling the function of a multiplexing distributed sensor network. The present invention has a simple structure and a low cost, and can enhance the spatial resolution by increasing the number of the frequency shifters. In addition, the spacing between neighboring FBG sensors in the present invention can reach the millimeter level, which is particularly suitable for a micro-scale quasi-distributed sensing system.

DETAILED DESCRIPTION OF THE PREFERRED EMBODIMENTS

Further explanation of the present invention is provided hereinafter with reference to accompanying drawings and specific embodiments. It is appreciated that these embodiments are intended merely to illustrate the present invention and not to limit the scope of the present invention. Various equivalent modifications made by those skilled in the art upon reviewing the present invention shall fall within the scope defined by the claims of this application.

Embodiment 1

Figure 1:
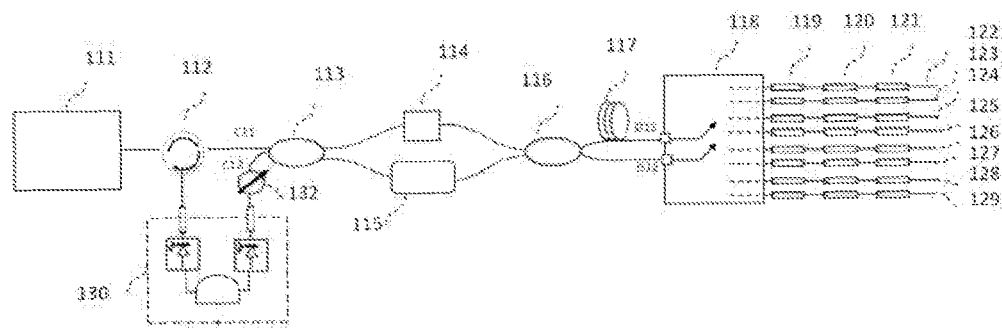
FIG. 1 is a structural schematic view of embodiment 1 of the present invention.

FIG. 1 shows a demodulation system for 3D-matrix multi-channel fiber optic sensing based on Bragg gratings. The system comprises a wavelength swept optical source 111 that emits various wavelengths of light. The various wavelengths of light enter a fiber circulator 112 from the wavelength swept optical source 111. The other two ports of the fiber circulator 112 are connected to an optical frequency domain reflector and a balanced detector 130, respectively. The optical frequency domain reflector comprises a first optical path and a second optical path parallel to each other. Both optical paths have their inlets connected to a first 3 dB coupler 113 and their outlets connected to a second 3 dB coupler 116. A frequency shifter 115 is arranged on the second optical path. The first 3 dB coupler 113 splits the light equally into a first beam and a second beam that enter a first optical path and a second optical path of the optical frequency domain reflector, respectively. A polarization controller 114 is arranged on the first optical path, and a frequency shifter 115 is arranged on the second optical path. The frequency shifter 115 is an acousto-optic modulator. After passing through the frequency shifter 115, the second beam gains a frequency shift f of a magnitude dependent on an external frequency shift driver. Therefore, after passing through the second 3 dB coupler 116, the first and second beams become a third beam and a fourth beam that have frequency shifts 0 and f, respectively. The third beam enters directly into the first input D11 of an optical switch module 118. In order to increase the optical length of the fourth beam so as to be distinguished from the third beam, the fourth beam passes through an optical fiber 117 before entering the second input D12 of the optical switch module 118. This is because, as will be described below, the optical switch module 118 consists of two optical switches that operate independently and have the same optical length. The system cannot distinguish between the reflection lights from the two optical switches without the optical fiber 117.

The optical switch module 118 consists of two optical switches. In fact, the first input D11 and the second input D12 are two inputs for the two optical switches in the optical switch module 118 respectively. Each optical switch has one input and four outputs, so that the optical switch module 118 has eight outputs in total, each output being connected to a sensor cable. The optical switch has to be bidirectional, so that the reflected signal can be reflected back to the optical frequency domain reflector. Such an optical switch module 118 consisting of two optical switches can switch two channels simultaneously, thereby significantly enhancing the efficiency of optical path switching.

As shown in FIG. 1, the optical switch module 118 has two inputs and a plurality of outputs, each of which is connected to one of eight sensor cables which consists of a first sensor cable 122, a second sensor cable 123, to an eighth sensor cable 129. Each sensor cable carries O*M FBG sensors, where M is the dimension of wavelength multiplexing, O is the number of sensors at the same Bragg wavelength along the same sensor cable, and M is the number of different Bragg wavelengths at which the FBG sensors along the same sensor cable are operating. For example, O*M=3, which indicates that three FBG sensors, i.e., a first sensor 119, a second sensor 120, and a third sensor 121 are connected in series on the first sensor cable 122 as shown in FIG. 1. The fiber 117 should be longer even than the longest sensor cable in order to avoid overlapping of signals reflected from different sensor cables. The light is transmitted through the optical switch module 118 to a set of FBG sensors positioned on the same sensor cable. All of these FBG sensors exhibit a low reflectivity at their operating wavelengths. Due to their low reflectivity of about 4%, the front FBG sensor has a negligible shadow effect when the spectra of the FBG sensors overlap. Thus, all the FBG sensors along the same sensor cable can reflect the light ray to the first input D11 and second input D12. The reflection light then enters the second 3 dB coupler 116. Reflection light rays having frequency shifts 0 and f are coupled into the two optical paths of the optical frequency domain reflector, i.e., the optical paths on which the polarization controller 114 and the frequency shifter 115 are respectively positioned. Therefore, the reflection light rays at the first 3 dB coupler 113 have four frequency shifts, which are 0 and f from the first optical path and f and 2f from the second optical path, respectively. As is well known, only light rays having the same frequency shift f would interfere to generate interfering signals. The other light rays, however, will not interfere due to the different frequency shifts and unbalanced optical paths. The interfering signals at the first port C11 and second port C12 result from the signals reflected by the i-th sensor on the k-th sensor cable, expressed as:

$$(I_i^k)_{C11C12} = R_i(\lambda)\left[2 \pm \cos\left(\frac{4\pi n_{eff} L_i \Delta f}{ct_{sw}} t\right)\right] + R_i(\lambda)\left\{2 \pm \cos\left[\frac{4\pi n_{eff}(L_0 + L_i)\Delta f}{ct_{sw}} t\right]\right\}, \quad (1)$$

where k is the number of the sensor cable, $R_i(\lambda)$ is the reflectivity of the i-th sensor at light wavelength $\lambda$, c is the velocity of light in vacuum, $n_{eff}$ is the effective group refractive index of the optical fiber, $L_i$ is the length between the second 3 dB coupler 116 and the i-th sensor, $L_0$ is the length of the optical fiber 117, and $\Delta f$ and $t_{sw}$ are the frequency sweep range and frequency sweep period of the frequency shift 115. For simplicity of the expressions, all the sensor cables are denoted by the same designations as the sensors on which they are positioned.

As shown in FIG. 1, the interfering signal at the first port C11 is coupled into an input of the balanced detector 130 which is a photoelectric converter capable of filtering DC components. The interfering signal at the second port C12 goes through a variable optical attenuator 132 to balance the DC components and is then coupled into another input of the balanced detector 130. The optical attenuator 132 may be a refractor, an optical splitter, or a scatter. Thus the DC components in Eq. (1) can be effectively removed. The interfering signals produced by the other FBG sensors are expressed as:

$$I^k(\lambda) = \sum_{i=1}^{O*M}\left[\prod_{j=1}^{i-1}[1-R_j(\lambda)]^2 R_i(\lambda)\sin\left(\frac{4\pi n_{eff} L_i \Delta f}{ct_{sw}} t\right)\right] + \sum_{i=1}^{O*M}\left\{\prod_{j=1}^{i-1}[1-R_j(\lambda)]^2 R_i(\lambda)\sin\left[\frac{4\pi n_{eff}(L_0+L_i)\Delta f}{ct_{sw}} t\right]\right\}, \quad (2)$$

where c is the velocity of light in vacuum, $n_{eff}$ is the effective group refractive index of the optical fiber, $L_i$ is the length between the second 3 dB coupler 116 and the i-th sensor, $L_0$ is the length of optical fiber 117, and $\Delta f$ and $t_{sw}$ are the frequency sweep range and frequency sweep period of the frequency shifter 115, respectively, and $R_i(\lambda)$ is the reflectivity of the i-th sensor at light wavelength $\lambda$. As the sweeping speed of the wavelength swept optical source 111 is much lower than that of the frequency shifter 115, the wavelength $\lambda$ can be treated as constant throughout the frequency sweep period of the frequency shifter 115. A Fast Fourier Transform is applied to the interfering signal in Eq. (2). The strength of Fourier components represents the reflectivity at a specific FBG sensor, and the location of the sensor where the light is reflected is expressed as:

$$L_i = \frac{ct_{sw}}{2n_{eff}\Delta f} F_i, \quad (3)$$

where i=1, 2, . . . O*M indicates the number of the sensor. When the wavelength swept optical source 111 is swept, the spectra of all the sensors can be acquired, regardless of overlapping spectra. By sweeping all the channels of the optical switch module 118, all the sensors on the sensor cable can be respectively interrogated. The smallest distinguishable distance between or the spatial resolution of two neighboring sensors when their reflection spectra are overlapped is expresses as:

$$\delta L = \frac{c}{2n_{eff}\Delta f} \quad (4)$$

Figure 2:
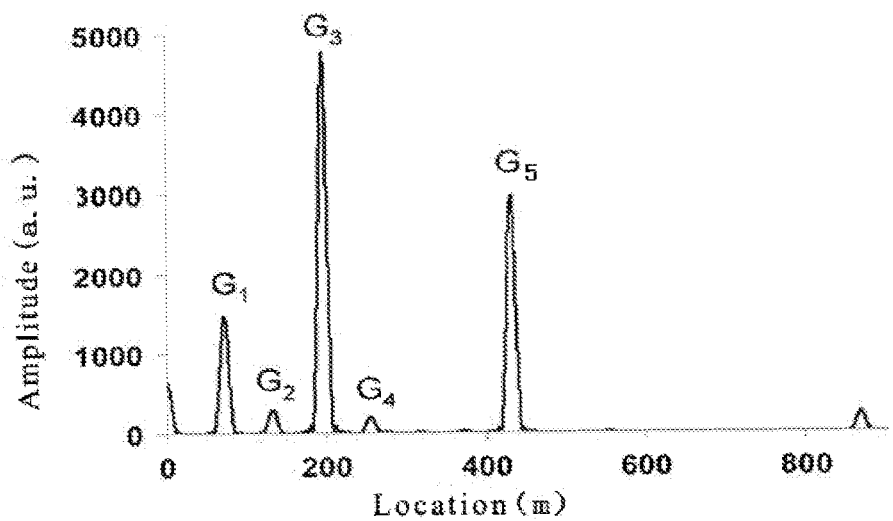
FIG. 2 is a schematic view showing the locations of the sensors for experimentation of embodiment 1 of the present invention.

In order to experiment with this embodiment, a LabVIEW program was developed to control the wavelength swept optical source, and a computer is used to perform data acquisition and processing. The wavelength swept optical source sweeps from 90 MHz to 110 MHz at a 0.04-MHz step with a time interval of 1 ms. All the FBG sensors have a reflectivity of about 4% and neighboring sensors are spaced at about 55 m. As shown in FIG. 2, when the wavelength swept optical source emits 1548.675 nm wavelength of light, the Bragg wavelengths for the locations of the ten FBG sensors G1 through G10 (of which G5, G6, G8, G9, and G10 are not shown) resolved by the present invention are centered around 1548.6 nm. G1, G2, G3, G4, and G7 are spectra overlapped.

Figure 3:
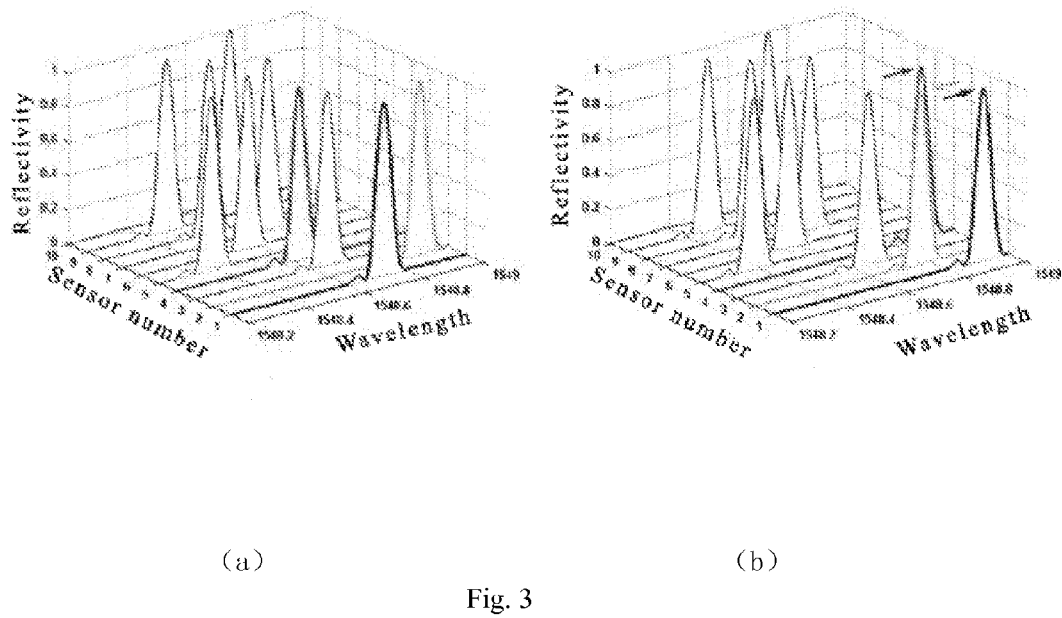
FIG. 3(a) shows the spectrogram of all the FBG sensors before strain application.
FIG. 3(b) shows the spectrogram of all the FBG sensors after strain application.

FIG. 3 shows the reflection spectra of all the ten FBG sensors. FIG. 3(a) shows the spectrogram before strain application and FIG. 3(b) shows the spectrogram after strain application to G1, G2, and G4. Comparison of FIG. 3(a) and FIG. 3(b) reveals clearly the change in wavelength of G1, G2, and G4 after strain application.

Embodiment 2

Figure 4:
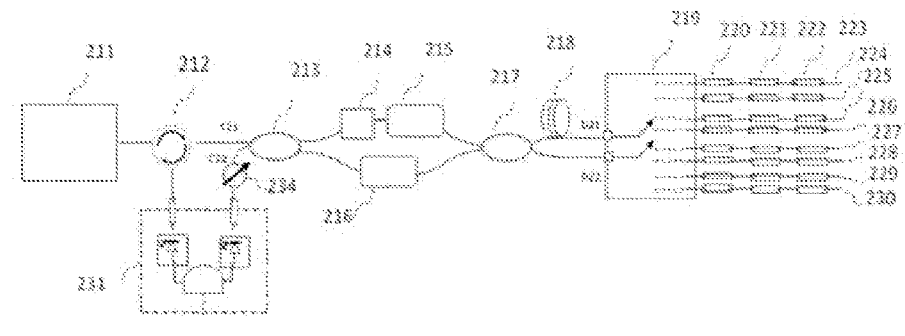
FIG. 4 is a structural schematic view of embodiment 2 of the present invention.

In another embodiment of the present invention shown in FIG. 4, a first frequency shifter 215 and a second frequency shifter 216 are respectively positioned on two optical paths. The first frequency shifter 215 lowers the frequency of the incident optical signal by $f_1$, and the second frequency shifter 216 increases the frequency of the incident optical signal by $f_2$. The first frequency shifter 215 and the second frequency shifter 216 are swept in opposite directions. That is, the second frequency shifter 216 is swept from 90 MHz to 110 MHz, and the first frequency shifter 215 is swept from 110 MHz to 90 MHz. Similarly to embodiment 1, the interfering signals at the third port C21 and the fourth port C22 shall contain the frequency components $-2f_1$, $2f_2$, $f_2-f_1$, and $f_2-f_1$. Only lights having the same frequency shift can interfere with each other and produce measurable interfering signals, such as $f_2-f_1$. Given the frequency sweep range of $\Delta f_1$ and $\Delta f_2$ respectively for the first frequency shifter 215 and second frequency shifter 216, the equation (2) from embodiment 1 becomes as follows:

$$I^k(\lambda) = \sum_{i=1}^{O*M}\left[\prod_{j=1}^{i-1}[1-R_j(\lambda)]^2 R_i(\lambda)\sin\left(\frac{4\pi n_{eff} L_i}{c} \frac{\Delta f_1 + \Delta f_2}{t_{sw}} \cdot t\right)\right] + \sum_{i=1}^{O*M}\left\{\prod_{j=1}^{i-1}[1-R_j(\lambda)]^2 R_i(\lambda)\sin\left[\frac{4\pi n_{eff}(L_0+L_i)}{c} \frac{\Delta f_1 + \Delta f_2}{t_{sw}} \cdot t\right]\right\}. \quad (5)$$

When a Fast Fourier Transform is applied to eq (5), the locations of the FBG sensors are represented by the frequencies of the Fourier components, and the reflectivities of the FBG sensors are represented by the strengths of the Fourier components. The location of the i-th FBG sensor is expressed as:

$$L_i = \frac{ct_{sw}}{2n_{eff}(\Delta f_1 + \Delta f_2)} F_i, \quad (6)$$

and the spatial resolution is expressed as:

$$\delta L = \frac{c}{2n_{eff}(\Delta f_1 + \Delta f_2)} \quad (7)$$

Obviously, an increased spatial resolution δL can be achieved through a greater frequency shift generated by the frequency shifter.

The sensor network in this embodiment differs from that in embodiment 1 in that the outputs of the optical switch module 219 are connected with a first sensor cable 223 through an eighth sensor cable 230, with three sets of FBG sensors connected in series on each of the sensor cables. For example, a first sensor set 220, a second sensor set 221, and a third sensor set 222 are connected in series on the first sensor cable 223. In a similar manner, there may be more sensor sets connected in series on each sensor cable, and each sensor set may have more sensors connected in series.

Figure 5:
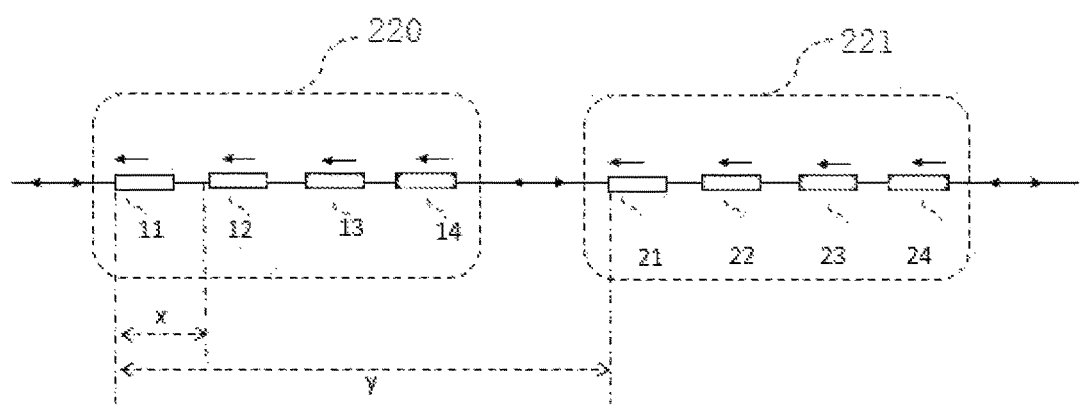
FIG. 5 is a structural schematic view of sensor sets in embodiment 2 of the present invention.

By way of example, the first sensor set 220 and the second sensor set 221 as shown in FIG. 5 each includes four identical FBG sensors without overlapping spectra. The first sensor set 220 includes an eleventh sensor 11, a twelfth sensor 12, and a thirteenth sensor 13, and a fourteenth sensor 14. The second sensor set 221 includes a twenty first sensor 21, a twenty second sensor 22, a twenty third sensor 23, and a twenty fourth sensor 24. The two neighboring FBG sensors in each set are spaced by a very short distance of x or even in contact with each other for ease of interrogation. Such an arrangement can improve the spatial resolution, which is more suitable for a quasi-distributed sensor network. However, the corresponding FBG sensors in different sets should be spaced by a distance of y that is larger than the spatial resolution δL. Apart from that, this embodiment is the same as embodiment 1.

More frequency shifters, e.g., Q frequency shifters (Q is a positive integer), may be arranged on the two optical paths of the optical frequency domain reflector. Given a frequency sweep range $\Delta f_1, \Delta f_2 \ldots \Delta f_Q$ of the frequency shifters respectively, then the spatial resolution of δL is expressed as:

$$\delta L = \frac{c}{2n_{eff}(\Delta f_1 + \Delta f_2 + \ldots + \Delta f_Q)} \quad (8)$$

As seen from Eq. (8), an increased number of frequency shifters can result in an improved spatial resolution.

Embodiment 3

In this embodiment, the optical switch module consists of a single optical switch with one input and four outputs. Therefore, compared with the optical switch module in embodiment 1, only 50% of incident light is utilized in the optical frequency domain reflector, while the other 50% of incident light is not utilized. Also, the number of sensors that can be contained in the optical switch module is reduced by 50%. Therefore, the device in this embodiment is more economic. Apart from that, this embodiment is the same as embodiment 1.

What is claimed is:

1. A demodulation system for 3D-matrix multi-channel fiber optic sensing comprising
    a wavelength swept optical source that generates an incident light, characterized in that demodulation system further comprises
    an optical frequency domain reflector and a balanced detector connected with the wavelength swept optical source through a fiber circulator,
    wherein the optical frequency domain reflector comprises a first optical path and a second optical path with a frequency shifter associated with a frequency sweep range arranged on one or both of the optical paths,
    the optical frequency domain reflector outputs the incident light to an optical switch module,
    the optical switch module selectively transmits the incident light to a sensor network as well as transmits the reflection light from the sensor network to the optical frequency domain reflector, wherein a front Fiber Bragg Grating (FBG) sensor of the sensor network has a reflectivity of about 4%, and
    an interfering signal generated from the reflection light after passing through the optical frequency domain reflector is detected by the balanced detector,
    where the sensor network is a 3D sensor network that includes N*M*O sensors, wherein N is a number of sensing cables, M is a number of the multiplexing wavelengths, and O is a number of sensor elements at the same center wavelengths.

2. The demodulation system for 3D-matrix multi-channel fiber optic sensing of claim 1, wherein the optical frequency domain reflector comprises a first 3 dB coupler and a second 3 dB coupler, and wherein the first optical path and second optical path of the optical frequency domain reflector have their inlets connected to the first 3 dB coupler and their outlets connected to the second 3 dB coupler.

3. The demodulation system for 3D-matrix multi-channel fiber optic sensing of claim 2, wherein at least one frequency shifter is connected in series on one optical path, and a polarization controller is arranged on the other optical path.

4. The demodulation system for 3D-matrix multi-channel fiber optic sensing of claim 2, wherein a polarization controller and at least one frequency shifter are connected in series on one optical path, and at least one frequency shifter is connected in series on the other optical path.

5. The demodulation system for 3D-matrix multi-channel fiber optic sensing of claim 4, wherein the frequency shifters on the two optical paths change the frequency in opposite directions.

6. The demodulation system for 3D-matrix multi-channel fiber optic sensing of claim 1, wherein the optical switch module consists of two optical switches connected in parallel to form a dual-set N-channel optical switch.

7. The demodulation system for 3D-matrix multi-channel fiber optic sensing of claim 1, wherein the optical switch module includes a single optical switch.

8. The demodulation system for 3D-matrix multi-channel fiber optic sensing of claim 6, wherein an input of one of the optical switches is cascaded with a length of an optical fiber to form the dual-set N-channel optical switch, and the length of the optical fiber is used to separate two fiber cables.

9. The demodulation system for 3D-matrix multi-channel fiber optic sensing of claim 1, wherein the sensor network consists of a plurality of parallel sensor cables and a plurality of FBG sensors are connected in series on each of the sensor cables.

10. The demodulation system for 3D-matrix multi-channel fiber optic sensing of claim 9, wherein three identical FBG sensors are connected in series on each of the sensor cables.

11. The demodulation system for 3D-matrix multi-channel fiber optic sensing of claim 9, wherein a plurality of sensor sets are connected in series on each of the sensor cables, and each of the sensor sets consists of a plurality of FBG sensors connected in series.

12. The demodulation system for 3D-matrix multi-channel fiber optic sensing of claim 11, wherein the spacing between neighboring sensor sets is larger than a spatial resolution $$\delta L = \frac{c}{2n_{eff}\Delta f},$$

and $\Delta f$ is the frequency sweep range of the frequency shifter, where c is the velocity of light in vacuum, $n_{eff}$ is the effective group refractive index of an optical fiber.

13. The demodulation system for 3D-matrix multi-channel fiber optic sensing of claim 1, wherein the wavelength swept optical source is a low coherent wavelength tunable laser light source.

14. The demodulation system for 3D-matrix multi-channel fiber optic sensing of claim 1, wherein the wavelength swept optical source is a Fourier-domain mode locking laser.

15. The demodulation system for 3D-matrix multi-channel fiber optic sensing of claim 1, wherein the signal detected by the balanced detector is expressed as $$I^k(\lambda) = \sum_{i=1}^{O*M}\left[\prod_{j=1}^{i-1}[1-R_j(\lambda)]^2 R_i(\lambda)\sin\left(\frac{4\pi n_{eff}L_i\Delta f}{ct_{sw}}t\right)\right] +$$

$$\sum_{i=1}^{O*M}\left\{\prod_{j=1}^{i-1}[1-R_j(\lambda)]^2 R_i(\lambda)\sin\left[\frac{4\pi n_{eff}(L_0+L_i)\Delta f}{ct_{sw}}t\right]\right\},$$

where c is the velocity of light in vacuum, $n_{eff}$ is the effective group refractive index of an optical fiber, $L_i$ is a length between a second 3 dB coupler and the i-th sensor, $L_0$ is a length of the optical fiber, $\Delta f$ and $t_{sw}$ are the frequency sweep range and the frequency sweep period of the frequency shifter, respectively, and $R_i(\lambda)$ is the reflectivity of the i-th sensor at light wavelength of $\lambda$.

16. The demodulation system for 3D-matrix multi-channel fiber optic sensing of claim 1, wherein the sensor network comprises a plurality of FBG sensors having a spatial resolution expressed as:

$$\delta L = \frac{c}{2n_{eff}(\Delta f_1 + \Delta f_2 + \ldots + \Delta f_Q)},$$

where Q is the number of the frequency shifters, c is the velocity of light in vacuum, $n_{eff}$ is the effective group refractive index of an optical fiber, and $\Delta f_i$ (i=1, 2, . . . Q) is the frequency sweep range of the i-th frequency shifter.

* * * * *